Sept. 1, 1931.  C. Y. KNIGHT  1,821,063
STEERING APPARATUS FOR MOTOR VEHICLES
Filed April 7, 1926  2 Sheets-Sheet 1
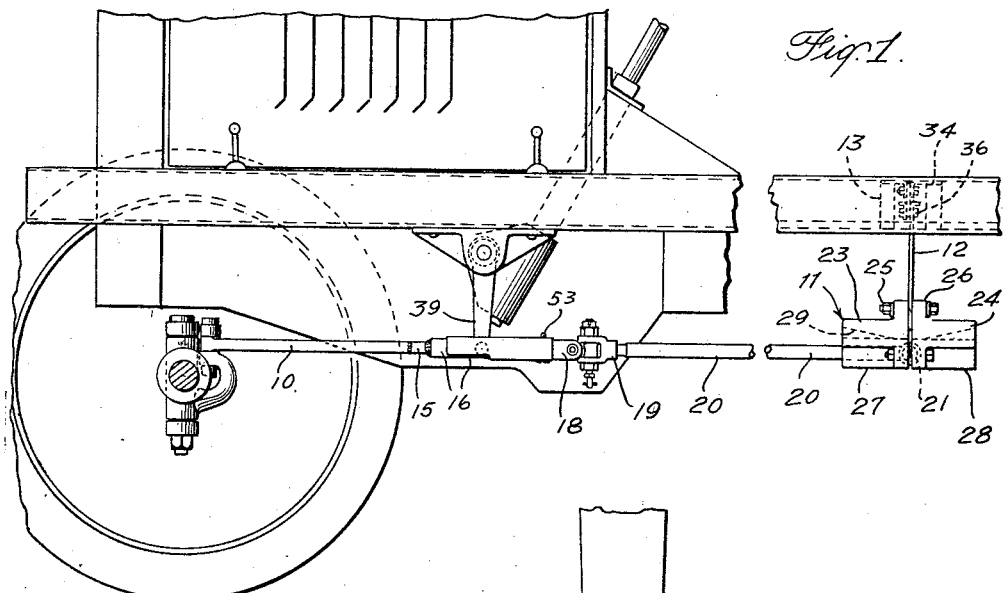
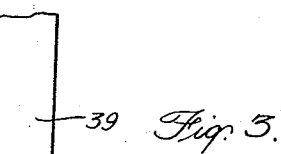
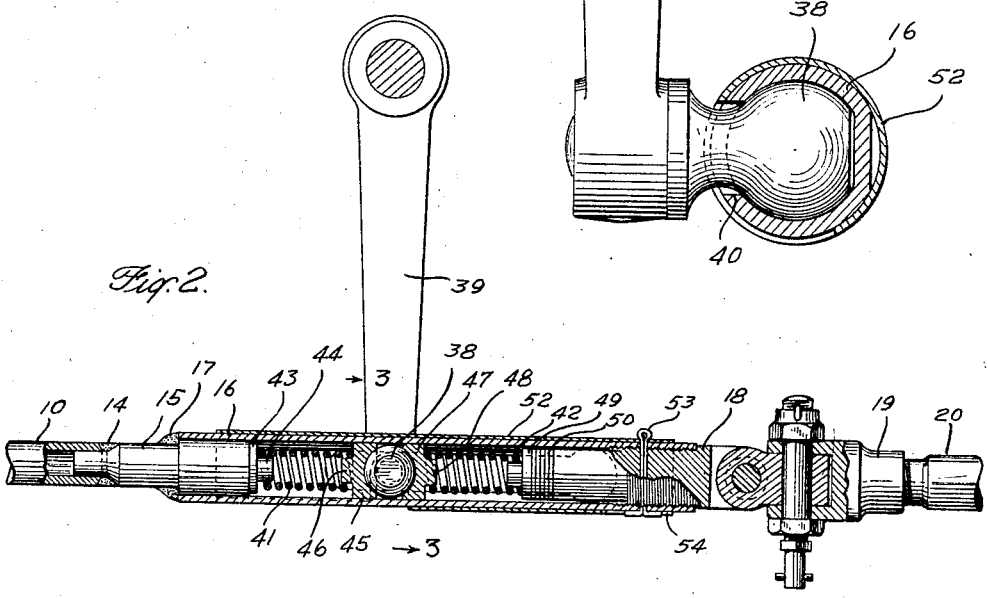
INVENTOR
CHARLES Y. KNIGHT.
BY
Chester W Braselton
ATTORNEY

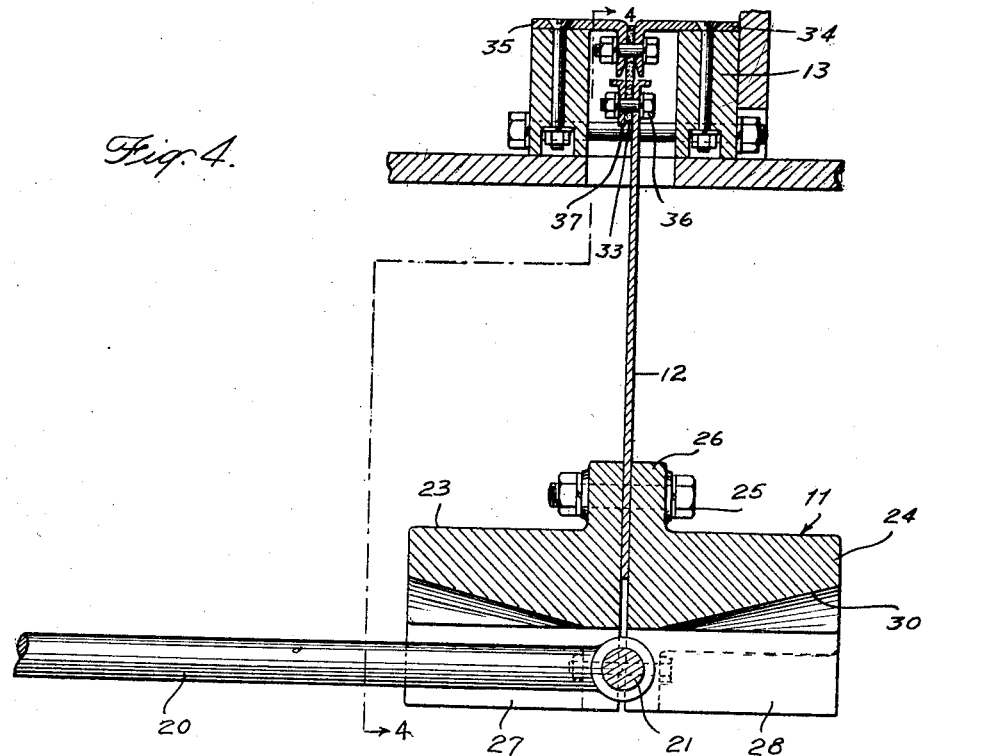
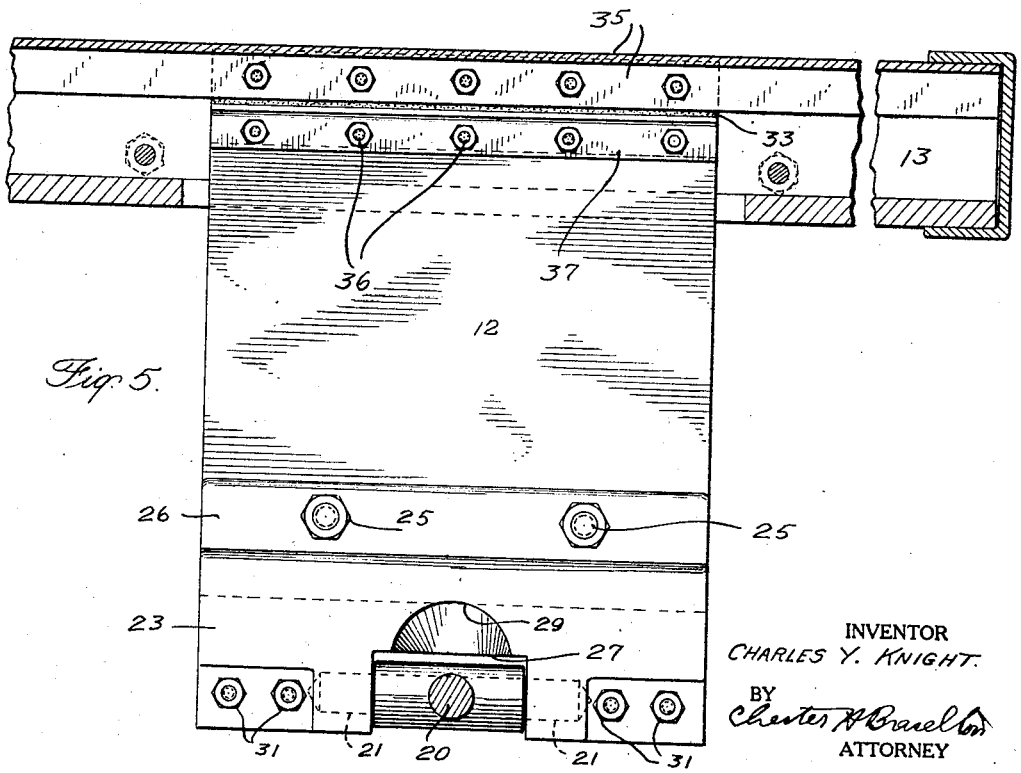

Patented Sept. 1, 1931

1,821,063

UNITED STATES PATENT OFFICE

CHARLES Y. KNIGHT, OF PASADENA, CALIFORNIA, ASSIGNOR, BY MESNE ASSIGNMENTS, TO CHESTER H. BRASELTON CORPORATION, OF JERSEY CITY, NEW JERSEY, A CORPORATION OF DELAWARE

STEERING APPARATUS FOR MOTOR VEHICLES

Application filed April 7, 1926. Serial No. 100,210.

My present invention relates to a steering apparatus for motor vehicles and, more particularly, to a steering apparatus in which the vibrations resulting from the passage of the front wheels of the vehicle over the irregularities of the road are absorbed at some point between the wheels and the body of the car.

As a vehicle is driven at high speeds the engine vibrations and the slight depressions and obstructions in the paths of the front wheels impart thrusts which are revolved horizontally as well as vertically and these horizontal thrusts or impacts are transmitted to the rod connecting the turning knuckle of the wheels to the steering elements. If the force of these impacts are transmitted to and received by the steering elements, they cause an annoying and unpleasant jarring and vibration of the steering post and body of the vehicle as well as causing a more rapid wearing of the connecting mechanism.

Vibrations of the steering post in this manner are avoided in my present invention and other vibrations are reduced, one object of the invention being to absorb or take up the vibrations before they reach the body of the car.

Another object of the invention is to provide a steering apparatus in which the vibrations transmitted from the front wheels are taken up by the inertia of a mass or weight which stabilizes the wheels in the position properly fixed for them by the position of the steering post.

Further objects and features of the invention are: to provide a yielding or resilient connection between the rod connected to the front wheel turning knuckle and the connection to the steering post, to provide a resilient connection between the steering post and the rod connecting to the steering knuckle and also a freely movable mass rigidly connected to the connecting rod and having sufficient resistance to hold the connecting rod and wheels in position while permitting the shifting of the rod from the steering post, and also to provide a simple and effective means for holding the front wheels in position by a weight resistance means independent of the steering post and resiliently connected thereto.

With these and other objects in view, which will appear from the following description, the invention comprises the steering apparatus described and set forth in the following specification and claims.

The various features of the invention are illustrated in the accompanying drawings in which:

Fig. 1 is a side view of a motor vehicle incorporating my invention;

Fig. 2 is a vertical longitudinal sectional view through a part of a steering apparatus embodying a preferred form of the invention;

Fig. 3 is a vertical cross sectional view taken on line 3—3 of Fig. 2;

Fig. 4 is a section through the shock absorbing unit; and

Fig. 5 is an end view taken on line 4—4 of Fig. 4.

In my present invention a suspended or otherwise freely supported weight is rigidly or fixedly secured to the rod connecting the steering elements to the steering knuckle of the front wheels so as to permit the connecting rod to move to any of the desired steering positions. The jars and vibrations received by the connecting rod from the wheels are transmitted directly to this mass or weight, the inertia of which is sufficient to hold the wheels in position and to restrain the vibration of the front wheels to a negligible minimum. In turning the front wheels to steer the vehicle the connecting rod and weight are shifted from the steering post elements through a resilient connection, which permits a slight relative movement between the connecting rod and the steering post and thus permits the slight longitudinal vibration movements of the connecting rod without transmiting them to the steering post. A positive movement of the post, however, acts through the resilient connection to move the connecting rod and weight and with them the wheels to the desired steering positions.

Referring more particularly to the accompanying drawings, the vibrations transmitted from the front wheels of a vehicle through the turning knuckles to a connecting rod 10 are absorbed in a mass or weight 11 suspended by an arm 12 from a cross beam 13 of the vehicle and rigidly connected to the rod 10 by any suitable connection. In the embodiment shown in the drawings, the rod 10 is hollow and is welded at 14 to a short rod 15, one end of which projects into the rear end of the hollow rod 10 and the other end of which projects into the front end of a tube or hollow rod 16, to which it is welded at 17. The rear end of the tube 16 is threaded to receive and hold the front end of a universal joint member 18, the rear member 19 of which is provided with a rod 20 which extends rearwardly and is secured to the weight 11 by means of a cross pin 21 secured to the weight 11 and passing through an eye or bearing 22 in the end of the rod 20.

The weight 11 may be of any suitable construction and suspended in any suitable manner from the frame of the vehicle. Its mass is, of course in proportion to the force of the vibrations that are to be absorbed or counteracted. In the embodiment shown by way of example in the drawings, the weight 11 is of a transversely split construction, being formed of a front portion 23 and a rear portion 24 secured to each other by means of bolts 25, passing through upwardly projecting ears 26 of the portions. The bottom surfaces of the weight portions 23 and 24 are provided with aligned longitudinal grooves 27 and 28 to receive the rod 20, the upper surfaces of the grooves being inclined upwardly and outwardly at 29 and 30, to permit a relative rocking movement between the rod and weight. The lower portions of the weight portions 23 and 24 are also provided with complementary, transverse, semicircular, horizontal grooves in their opposed faces at each side of the grooves 27 and 28 forming openings into which the end of the pin 21 project. The weight portions 23 and 24 are further secured at their lower side edges and the pin 21 is secured in position by means of bolts 31 passing through sidewise projecting ears 32 at the level of the pin 21 and through the pin itself.

In the embodiment of the invention shown in the drawings the weight 11 is suspended by means of an arm 12 secured between the weight portions 23 and 24 by means of the bolts 25 and secured at its upper end by a fabric hinge to the cross beam 13 of the vehicle. This fabric hinge may be constructed of a strip of fabric 33 clamped at its upper edge between a pair of angle irons 34 and 35 by means of bolts and clamped at its lower edge by means of bolts 36 between the upper edge portion of the arm 12 and a strip of metal 37.

From the above description, it will be apparent that any movement or force imparted to the rod 10 is transmitted directly to the weight 11 and that the force of any impacts or thrusts or tensions must overcome the relatively large inertia of the mass 11 as well as the relatively insignificant inertia of the rod 10 before it can cause any movement or vibration of the rod. When the impacts or pulls are of very short duration, as in the case of those resulting from irregularities in the road, the inertia of the mass 11 may be readily made sufficient to restrain the movement or vibration of the rod 10 to a negligible minimum. A weight of about sixty pounds will usually suffice for this purpose.

As the weight 11 is freely movable, it may, however, be easily moved to permit the rod 10 to be shifted to various steering positions when a continued moving force, such as that imparted from a steering post, acts on the rod. It will be obvious that a force of relatively slight intensity, as compared with that received from the front wheels, is required to shift the rod 10 and weight 11 from the steering post because this force is a long continued one.

As the vibrational movement of the rod 10 has been reduced to a minimum by the inertia of the mass 11, it can not impart any very severe vibrations to any gearing or transmitting elements connected to it. To more completely eliminate vibration from the steering post, however, a resilient connection is provided between the steering post elements and the rod 10, which permits a slight relative movement of the rod and steering elements.

In the embodiment shown in the drawings, this is provided by mounting a spherically headed pin or knob 38 at the lower end of the crank 39 depending from the steering post elements in such a position as to project through a longitudinal slit 40 in the hollow rod or tube 16 to a point within the tube between the ends of the rod 15 and of the front universal joint member 18. Two springs 41 and 42 are then provided respectively between the knob 38 and the rod 15 on the one side and the member 18 on the other. These springs act as stops fixed in the tube 16, to enable the knob 38 to shift the tube 16 and rod 10 while permitting a slight relative movement between the rod and the knob. The spring 41 is preferably held in position at one end by means of a guiding plug 43 resting against the end of the rod 15 and having a boss 44 projecting into the forward end of the spring and at the other end by means of a plug 45 having a concaved surface fitting against the knob 38 and having a boss 46 projecting into rear end of the spring. The spring 42 is similarly guided between a plug 47 resting against the knob 38 and having a boss 48 and a plug 49 resting against spacing discs 50 interposed between this plug and the end of the member 18.

The pressures exerted on opposite sides of the knob 38 by the springs 41 and 42 are normally equal and balanced and serve to hold the rod and steering elements in proper position regardless of the impulses imparted to the rod 10 by the front wheels. When the crank 39 and knob 38 are shifted one way or the other by the steering post elements, however, one of the springs 41 or 42 is compressed and the other expands and a resultant pressure is exerted in one direction or the other to shift the rod 10. The pressure of the springs may be adjusted by inserting or removing spacing discs 50 between the plug 49 and member 18.

In assembling the knob 38 and spring elements in the tube 16, the joint element 18 is unscrewed from the rear end of the tube, the plug 43, spring 41, and plug 45 are then inserted through the open end of the tube, the knob 38 is inserted through an enlarged end 51 of the slit 40 and slid forwardly, and the plug 47, spring 42, plug 49, and spacing discs 50 are inserted into the tube. A protecting cover 52 is then slipped over the tube 16 covering the slit 40. The end of the member 18 is then screwed into place and held in place by means of a cotter pin 53 passing through aligned openings in the tube 16 and member 18 and also projecting into slits 54 in the cover 52 to hold the cover in position.

By means of the above invention, therefore, it will be apparent that the front wheels of a vehicle are held steady against the vibrational impulses caused by irregularities or unevenness in the road through the inertia of a mass independent of the steering post elements. In consequence the vibrations are reduced to a minimum. In addition, these slight vibration movements may be absorbed between the transmission elements and the steering elements, rendering the steering post entirely free from vibration.

As changes of construction could be made within the scope of my invention, it is desired that all matter contained in the above description or shown in the accompanying drawings shall be interpreted as illustrative and not in a limiting sense.

Having described my invention, what I claim and desire to secure by Letters Patent is:

1. Vehicle steering apparatus which comprises a connecting rod, a steering element, means for resiliently connecting said steering element to said connecting rod, and a resiliently mounted weight rigidly connected as to operative effect to said connecting rod.

2. Vehicle steering apparatus which comprises a connecting rod, a steering element, a connection between said steering element and said connecting rod comprising a spring, and a mass swingably supported from the vehicle frame and connected with the connecting rod rigidly as to operative effect so that said mass moves with said rod when said steering apparatus is operated.

3. Vehicle steering apparatus which comprises a connecting rod; a tubular member rigidly secured on said rod and having stops fixed therein; a steering element comprising a pin projecting into said tubular member between said fixed stops and slidable in said tubular member; a pair of springs one between said pin and each of said fixed stops; a weight swingably supported from the vehicle frame for movement in one plane only, and an operative connection between said weight and said connecting rod, said operative connection being rigid as to operative effect so as to permit said weight and connecting rod to move together when said steering apparatus is operated.

4. Vehicle steering apparatus which comprises a connecting rod; a tubular member rigidly secured on said rod and having stops fixed therein; a steering element comprising a pin projecting into said tubular member between said fixed stops and slidable in said tubular member; a pair of springs, one between said pin and each of said fixed stops; means for adjusting the tensions of said springs; a weight swingably supported on the vehicle frame for movement in one plane only, and an operative connection between said weight and said connecting rod, said connection being rigid as to operative effect so as to permit said weight and connecting rod to move together when said steering apparatus is operated.

5. Vehicle steering apparatus which comprises a connecting rod adapted to be connected to wheels to be steered; a steering element resiliently connected to shift said rod to different steering positions; a weight fixedly connected to said rod; and flexible means for suspending said weight from said vehicle to permit it to swing to different positions with said rod.

6. Vehicle steering apparatus which comprises a connecting rod adapted to be connected to wheels to be steered; a steering element resiliently connected to said rod to shift said rod to different steering positions; a weight connected in fixed relation to said rod; and means for suspending said weight from said vehicle to enable it to move with said rod.

7. Vehicle steering apparatus which comprises, a weight, means for suspending said weight from a vehicle, a steering element, a rod to connect said steering element to wheels to be steered, means for transmitting movement from said rod directly to said weight, and a resilient connection between said rod and said steering element.

8. Vehicle steering apparatus which comprises a steering element, a rod to connect said steering element to wheels to be steered, a pair of weight elements, a swinging arm suspended from the vehicle and clamped between said weight elements, and a rod connected to said connecting rod and pivotally connected to said weight.

In testimony whereof, I affix my signature.

CHARLES Y. KNIGHT.